United States Patent [19]
Hantle et al.

[11] Patent Number: 5,391,063
[45] Date of Patent: Feb. 21, 1995

[54] MAGNET ASSEMBLY FOR ELECTRIC FUEL PUMP

[75] Inventors: Edward A. Hantle, Caro; Orrin A. Woodward, Davison, both of Mich.

[73] Assignee: General Motors Corporation, Detroit, Mich.

[21] Appl. No.: 233,102

[22] Filed: Apr. 25, 1994

[51] Int. Cl.⁶ .............................................. F04B 17/00
[52] U.S. Cl. .................................. 417/423.7; 417/350; 417/366; 310/154
[58] Field of Search ..................... 417/423.7, 350, 366; 310/154

[56] References Cited

U.S. PATENT DOCUMENTS

| | | | |
|---|---|---|---|
| 3,969,044 | 7/1976 | Füssner et al. | 417/366 X |
| 4,500,270 | 2/1985 | Tuckey | 418/133 |
| 4,580,951 | 4/1986 | Carleton et al. | 417/366 |
| 4,587,449 | 5/1986 | West | 310/154 |
| 4,619,588 | 10/1986 | Moore, III | 417/366 |
| 4,626,178 | 12/1986 | Terumoto | 417/366 |
| 4,636,107 | 1/1987 | Casler et al. | 310/154 X |
| 4,953,284 | 9/1990 | Hammer et al. | 310/154 X |
| 5,053,664 | 10/1991 | Kikuta et al. | 310/154 X |
| 5,288,215 | 2/1994 | Chancellor et al. | 417/423.7 |

Primary Examiner—Richard E. Gluck
Attorney, Agent, or Firm—Saul Schwartz

[57] ABSTRACT

A magnet assembly in an electric motor of a motor vehicle fuel pump includes a tubular ferromagnetic flux carrier closely received in a shell of the fuel pump between a pump at one end of the shell and an end housing at the other end, a pair of arc-shaped permanent magnets on the flux carrier having a non-magnetic state as formed and a magnetic state after exposure to magnetic flux, an elongated arc-shaped plastic locator between the magnets, and a spring clip opposite the locator urging the magnets into magnet pockets in the locator. The plastic locator is the same length as the flux carrier and conforms to the curvature thereof. Each magnet pocket has a pair of short lateral sides which capture the magnets in their non-magnetic state and establish the locations thereof relative the ends of the flux carrier. The plastic locator is closely received between edges of an arc-shaped boss on the end housing assembly to effect accurate angular location of carbon brushes on the end housing assembly relative to the magnets.

4 Claims, 2 Drawing Sheets

MAGNET ASSEMBLY FOR ELECTRIC FUEL PUMP

FIELD OF THE INVENTION

This invention relates to electric fuel pumps for motor vehicles.

BACKGROUND OF THE INVENTION

Electric fuel pumps for motor vehicles commonly include a tubular outer housing or shell, a pump in the shell at one end thereof, an end housing in the shell at the other end thereof, and an electric motor in the shell between the pump and the end housing. The electric motor consists of an armature supported on the shell for rotation about a longitudinal centerline thereof and a magnet assembly around the armature including a tubular cylindrical flux carrier between the pump and the end housing and a pair of permanent field magnets. Current is conducted to the armature through brushes on the end housing bearing against a commutator on the armature in a plane perpendicular to the longitudinal centerline of the shell.

To locate the magnets angularly relative to the brushes around the inner surface of the flux carrier, some prior electric fuel pumps include a long plastic lug molded integrally on the end housing and projecting into the flux carrier. A spring between the magnets thrusts the magnets in opposite directions against opposite edges of the plastic lug. In these prior constructions, the end housing also has a plurality of short lugs which limit how close to the end housing the magnets may be located after the end housing is installed on the shell.

In another prior electric fuel pump, a plastic cage is closely received inside the flux carrier with a lug on the cage received in a slot in the flux carrier to establish the position of the cage relative to the flux carrier. The cage has a pair of windows therein which receive respective ones of the magnets. One edge of each window is an integral spring which urges the corresponding magnet against the opposite edge of the window. In this prior construction, the angular location of the brushes relative to the magnets is established indirectly through the flux carrier, i.e. by reception of a lug on the end housing on which the brushes are supported in the aforesaid slot in the flux carrier.

A magnet assembly according to this invention features simple, positive location of the magnets and is an improvement relative to the above described magnet locating apparatus of prior electric fuel pumps.

SUMMARY OF THE INVENTION

This invention is a new and improved magnet assembly in an electric motor of a motor vehicle fuel pump of the type including a tubular shell, a pump at one end of the shell on one side of the electric motor and an end housing in the shell at the other end thereof on the other side of the electric motor. The electric motor includes an armature supported on the shell for rotation about a longitudinal centerline thereof and a pair of carbon brushes supported on the end housing and bearing against a commutator on the armature in a plane perpendicular to the longitudinal centerline of the shell. The magnet assembly according to this invention includes a tubular ferromagnetic flux carrier closely received in the shell around the armature between the pump and the end housing, a pair of arc-shaped permanent magnets, an elongated arc-shaped plastic locator, and a spring clip. The plastic locator is the same length as the flux carrier, conforms to the curvature thereof, and includes a pair of laterally opening magnet pockets and a longitudinally opening notch at one end. The spring clip and the magnet locator are disposed opposite each other between the magnets on an inner wall surface of the flux carrier so that the spring clip positively seats the magnets in respective ones of the magnet pockets. The magnets are captured longitudinally between a pair of laterally extending edges of each magnet pocket for positive location of the magnets between the ends of the flux carrier. The notch in the plastic locator cooperates with a lug on the end housing to prevent reverse installation of the flux carrier relative to the end housing.

DESCRIPTION OF THE PREFERRED EMBODIMENT

Figure 1:
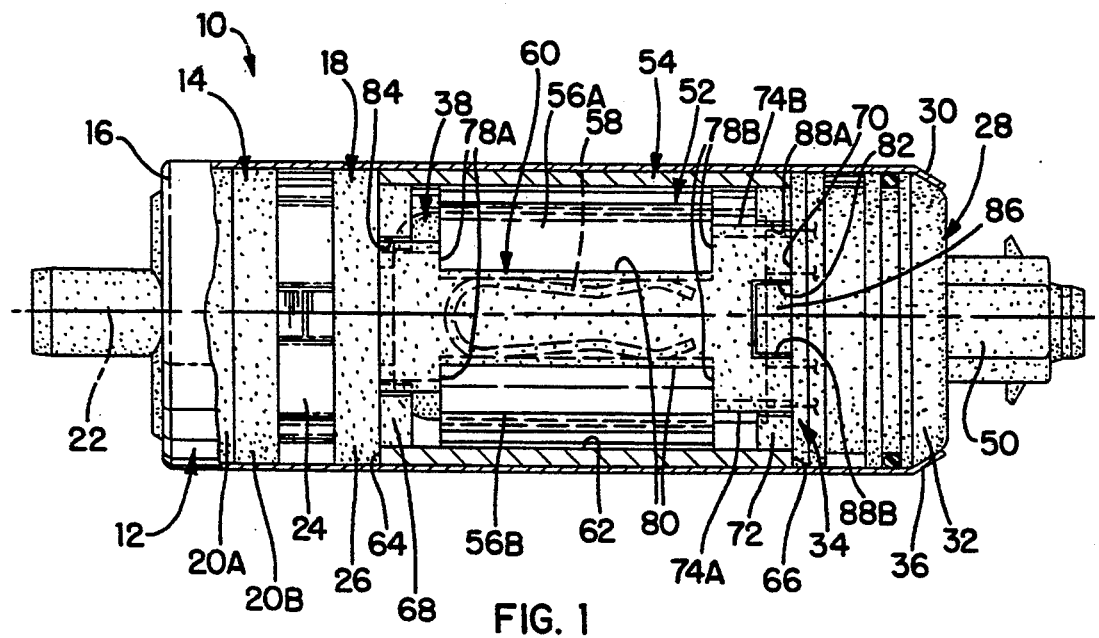
FIG. 1 is a partially broken-away side view of an electric fuel pump having a magnet assembly according to this invention.
Figure 2:
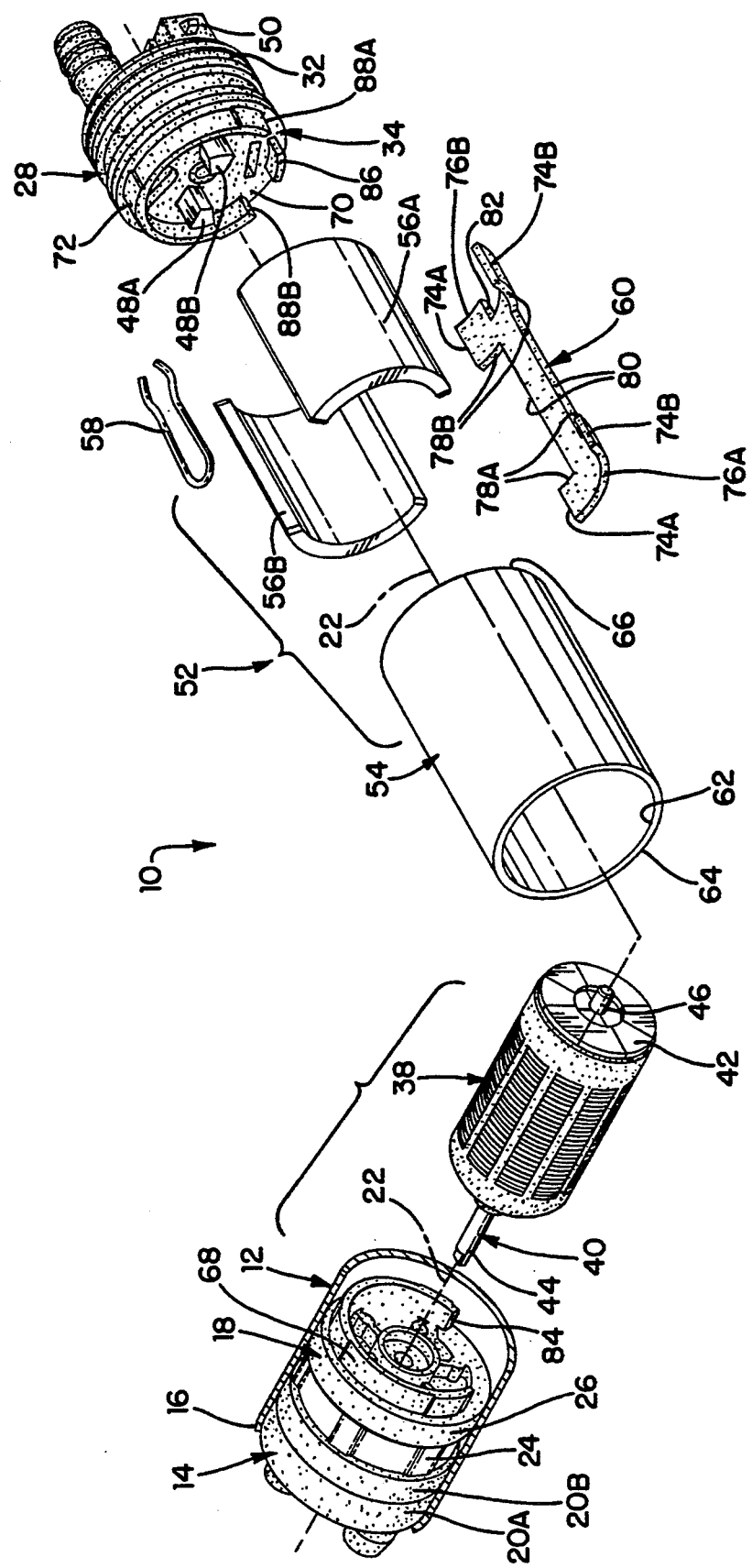
FIG. 2 is a fragmentary, exploded perspective view of the electric fuel pump shown in FIG. 1.

As seen best in FIGS. 1–2, an electric fuel pump 10 for a motor vehicle includes a thin-walled tubular steel shell 12, a low pressure pump 14 in the shell at a first end 16 thereof and a high pressure pump 18 in the shell adjacent the low pressure pump 14. The low pressure pump may be an open-vane regenerative turbine pump such as described in U.S. Pat. No. 4,734,008, issued Mar. 29, 1988 and assigned to the assignee of this invention, including a pair of disc-shaped housing elements 20A–B abutting a lip, not shown, on the shell at the first end thereof and closing the first end. An impeller, not shown, of the low pressure pump is supported in a cavity between the housing elements 20A–B for rotation about a longitudinal centerline 22 of the shell.

The high pressure pump may be a gerotor type positive displacement pump such as described in U.S. patent application Ser. No. 08/080248, filed Jun. 21, 1993 and assigned to the assignee of this invention, including a stationary metal support 24 captured between the housing element 20B of the low pressure pump and a plastic end wall 26 of the high pressure pump. An internally toothed outer ring, not shown, of the gerotor pump is mounted on the support 24 for rotation about an eccentric axis parallel to the centerline 22. An externally toothed inner ring, not shown, nests inside of and meshes with the teeth of the outer ring and is supported on the shell 12 for rotation about the centerline 22.

A plastic end housing assembly 28 of the fuel pump 10 is closely received in the shell 12 at a second end 30 thereof, FIG. 1, and may include a cup-shaped end housing 32 and a plastic brush carrier 34 nested inside the end housing. A lip 36 on the shell, FIG. 1, is permanently deformed over the end housing 32 to prevent dislodgement of the end housing assembly from the shell.

An electric motor of the fuel pump 10 is disposed in the shell 12 between the end wall 26 of the high pressure pump 18 and the end housing assembly 28 and includes an armature 38 having a shaft 40 and a commutator 42. A first end 44 of the shaft 40 is journaled on the end wall 26 and a second end 46 of the shaft 40 is similarly journaled on the plastic brush carrier 34 whereby the armature is supported on the shell 12 for rotation about the longitudinal centerline 22 thereof. The rotating elements of the low pressure and high pressure pumps 14, 18 are connected to the first end 44 of the armature shaft 40 for unitary rotation about the centerline 22.

A pair of carbon brushes 48A–B are supported on the brush carrier 34 for bodily movement parallel to the longitudinal centerline 22. The brushes 48A–B are urged into sliding engagement on the commutator 42 in a plane perpendicular to the longitudinal centerline 22 by springs, not shown, behind the brushes. A pair of electrical terminals, not shown, wired to the brushes 48A–B are shrouded by a plastic connector body 50 on the end housing 32 whereat the brushes are connected to a wiring harness, not shown, of the vehicle. A magnet assembly 52 according to this invention of the electric motor is disposed around the armature 38 between the end wall 26 and the brush carrier 34.

The magnet assembly 52 includes a flux carrier 54, a pair of permanent magnets 56A–B, a spring clip 58, and a plastic locator 60. The flux carrier 54 is a cylindrical, ferromagnetic tube closely received in the shell 12 having an inner wall surface 62, a first uninterrupted annular end 64, and a second uninterrupted annular end 66. The first end 64 of the flux carrier bears against the end wall 26 of the high pressure pump with the inner wall surface 62 piloted on a first arc-shaped boss 68 integral with the end wall 26. Similarly, the second end 66 of the flux carrier bears against a flat side 70 of the brush carrier 34 with the inner wall surface 62 piloted on an arc-shaped boss 72 integral with the brush carrier.

The permanent magnets 56A–B are each shaped from powder to conform to the curvature of the inner wall surface 62 of the flux carrier and include a pair of straight edges for orientation generally parallel to the longitudinal centerline 22 of the shell 12 and a pair of arcuate edges in parallel planes perpendicular to the straight edges. The magnets 56A–B have a non-magnetic state when first formed from powder in which they exhibit no magnetic properties and a magnetic state achieved when thereafter exposed to externally generated magnetic flux.

The locator 60 is an elongated, thin-wall, arc-shaped plastic element having a pair of parallel side edges 74A–B for orientation generally parallel to the longitudinal centerline 22 of the shell 12 and a pair of arc-shaped end edges 76A–B in parallel planes perpendicular to the side edges. The curvature of the locator conforms to the curvature of the inner wall surface 62 of the flux carrier. The side edges 74A–B are interrupted by a pair of outward opening magnet pockets, each having a pair of lateral short sides 78A–B at opposite ends of a long side 80. The arc-shaped end edge 76B is interrupted mid-way between the side edges 74A–B by a generally rectangular, outward opening notch 82.

The locator 60 and the spring clip 58 are situated on the inner wall surface 62 of the flux carrier diametrically opposite each other between the magnets 56A–B. The bias force of the spring clip urges the magnets in opposite directions into the magnet pockets in the locator 60 against the long sides 80 and radially outward against the inner wall surface 62. The magnets are captured longitudinally between the short sides 78A–B of the magnet pockets. Until the magnets 56A–B are charged by exposure to magnetic flux, it is only friction between the magnets and the flux carrier created by the force of the spring clip 58 on the magnets that holds the magnets in place on the flux carrier.

Figure 3:
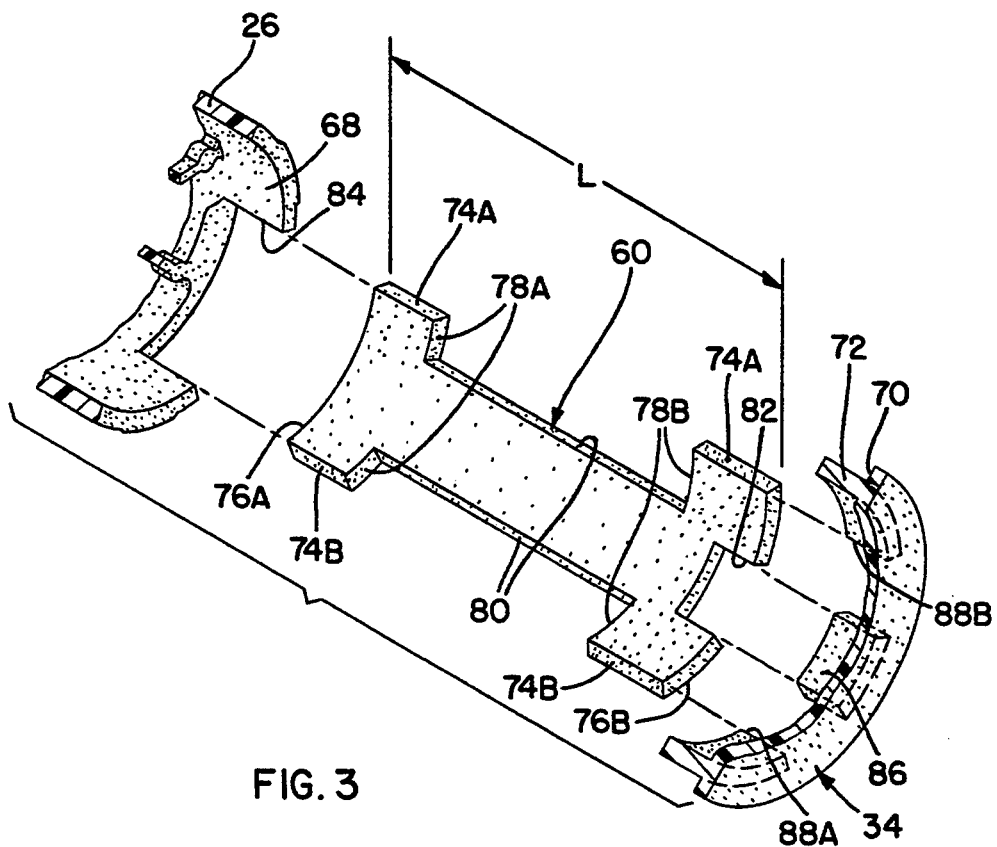
FIG. 3 is a fragmentary, enlarged perspective view of a portion of FIG. 2.

A length dimension "L" of the locator 60, FIG. 3, between the end edges 76A–B corresponds closely to a length dimension of the flux carrier 54 in the direction of the centerline 22 between the annular ends 64–66 of the carrier and is an important feature of this invention because it assures simple yet accurate longitudinal location of the unmagnetized magnets 56A–B relative to the ends 64–66 of the flux carrier. Such accurate location is essential for optimum performance of the electric motor of the fuel pump but is difficult to achieve because the magnets in their non-magnetic state are only relatively weakly held in place by the friction attributable to the spring clip 58 and are, therefore, prone to misalignment if the magnet assembly 52 is handled roughly prior to final installation in the fuel pump.

In assembling the fuel pump 10, the magnet assembly 52 with the magnets 56A–B in their non-magnetic state is inserted in the shell 12 after the pumps 14,18 but before the end housing assembly 28 until the annular end 64 of the flux carrier abuts the end wall 26 of the high pressure pump with the locator 60 disposed in a gap 84 in the first arc-shaped boss 68. The side edges 74A–B of the locator fit closely in the gap 84 and define a simple torque reaction connection between the pumps 14, 18 and the electric motor. If the end edge 76A of the locator 60 protrudes beyond the first end 64 of the flux carrier, indicating that the magnets 56A–B are not properly located longitudinally on the flux carrier, the protruding end edge of the locator is automatically pushed back into flush relationship with the end 64 of the flux carrier by the end wall 26.

After the flux carrier is installed, the end housing assembly 28 is rotated about the centerline 22 until a lug 86 on the brush carrier 34 is in angular registry with the notch 82 in the end edge 76B of the locator. The lug 86 is located in a gap in the boss 72 between a pair of edges 88A–B, FIG. 3, of the boss. The gap between the edges 88A–B corresponds closely to the arcuate length of the end edges 76A–B of the locator 60 between the side edges 74A–B thereof.

The end housing assembly is advanced into the shell until the flat side 70 of the brush carrier abuts the annular end 66 of the flux carrier. Concurrently, the lug 86 seats loosely in the notch and the locator 60 fits closely between the edges 88A–B on the boss 72. If the end edge 76B of the locator 60 protrudes beyond the second end 66 of the flux carrier, indicating that the magnets 56A–B are not properly located longitudinally on the flux carrier, the protruding end edge of the locator is automatically pushed back into flush relationship with the end 66 of the flux carrier by the brush carrier. After the lip 36 is deformed over the end housing assembly, the pump is exposed to magnetic flux to change the state of the magnets 56A–B from non-magnetic to magnetic.

Since the end edge 76A of the locator is uninterrupted, the notch 82 and the lug 86 cooperate to prevent reverse installation of magnet assembly in the shell 12. The close fit between the locator 60 and the edges 88A–B of the boss 72 on the brush carrier assures very accurate angular location of the brushes 48A–B on the brush carrier relative to the magnets 56A–B.

The physical simplicity of the locator 60 and flux carrier 54 are important attributes of this invention because each contributes to manufacturing economy. For example, because the flux carrier is devoid of perforations, slots, notches, and the like characteristic flux carriers in some prior electric fuel pumps, it is more economical to manufacture. Similarly, the locator 60 is simpler to manufacture by conventional plastic molding or permanent deformation of flat sheet techniques than the aforesaid prior angular locators molded integrally with plastic brush carriers or the aforesaid plastic cage.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. In a motor vehicle fuel pump including
   a thin-walled tubular shell,
   a pump in said shell at a first end thereof,
   an end housing assembly in said shell at a second end thereof, and
   an electric motor in said shell including an armature supported on said shell for rotation about a longitudinal centerline thereof and a commutator, and
   a pair of carbon brushes on said end housing assembly slidably engaging said commutator in a plane perpendicular to said longitudinal centerline,
   a magnet assembly comprising:
   a tubular ferromagnetic flux carrier closely received in said shell around said armature having a cylindrical inner wall surface and a first uninterrupted annular end abutting said pump and a second uninterrupted annular end abutting said end housing assembly,
   a pair of magnets on said inner wall surface of said flux carrier arc-shaped to conform to the curvature of said inner wall surface having a non-magnetic state as formed and a magnetic state after exposure to magnetic flux,
   a spring clip urging relative separation between said magnets in said non-magnetic state thereof in the circumferential direction of said inner wall surface,
   an arc-shaped plastic locator on said inner wall surface curved to conform to the curvature of said inner wall surface having a pair of side edges parallel to said longitudinal centerline and a pair of end edges substantially flush with corresponding ones of said first and said second annular ends of said flux carrier,
   means defining an outward opening magnet pocket in each of said side edges of said plastic locator each having a pair of lateral short sides at opposite ends of a long side,
   said spring clip biasing each of said magnets in said non-magnetic state thereof to a seated position in a corresponding one of said magnet pockets against said long side thereof and captured between said pair of short sides thereof whereby said magnets are located longitudinally relative to said first and said second annular ends of said flux carrier, and
   means on said end housing assembly closely receiving said plastic locator whereby the angular position of said brushes on said end housing is established relative to said magnets in said magnet pockets in said plastic locator.

2. The magnet assembly recited in claim 1 further including:
   means defining an outward opening notch in the one of said pair of end edges of said plastic locator substantially flush with said second annular end of said flux carrier, and
   means defining a lug on said end housing assembly received in said notch in said locator thereby to prevent reversal of said flux carrier relative to said end housing assembly.

3. The magnet assembly recited in claim 2 wherein said means on said end housing assembly closely receiving said plastic locator means includes:
   means on said end housing assembly defining an arc-shaped annular boss on which said inner cylindrical wall surface of said flux carrier is piloted having a gap therein defined between a pair of edges of said annular boss and between which is closely received said plastic locator.

4. The magnet assembly recited in claim 3 further including:
   means on said locator and on said pump defining a torque reaction connection therebetween.

* * * * *